Feb. 16, 1965    G. S. NAGLE ETAL    3,169,300
FOIL ROLL SYSTEM
Original Filed June 18, 1958    2 Sheets-Sheet 1
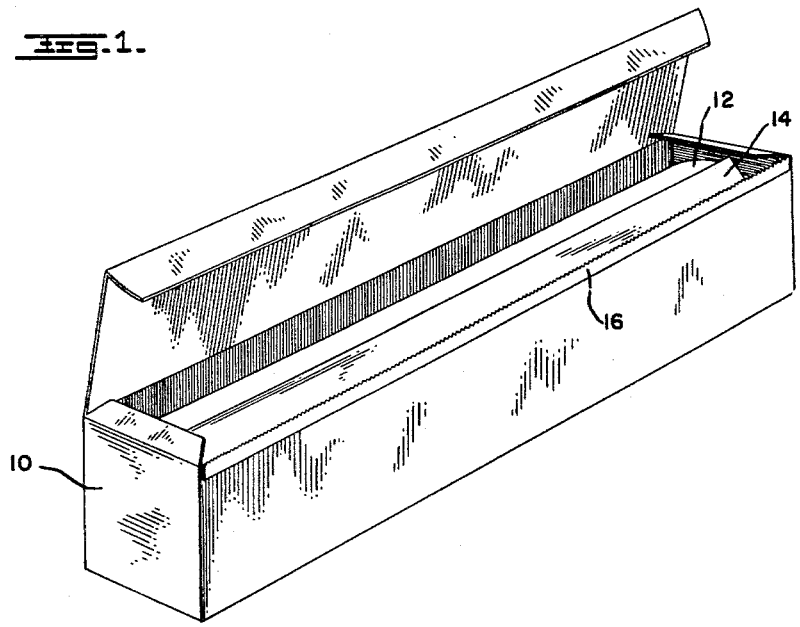
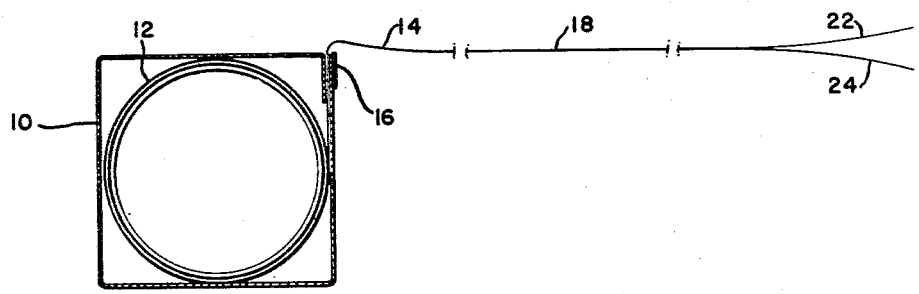
INVENTORS.
GARRETT S. NAGLE
JOE E. ROBERSON
By their attorneys
Glenn and Jackson Feb. 16, 1965  G. S. NAGLE ETAL  3,169,300
FOIL ROLL SYSTEM
Original Filed June 18, 1958  2 Sheets-Sheet 2
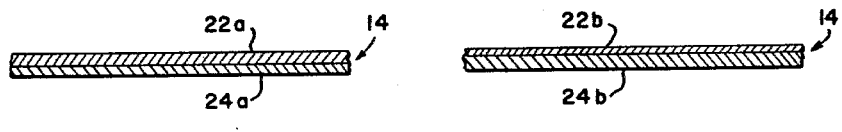
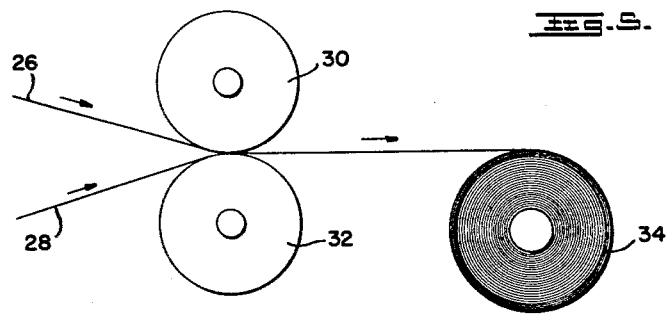
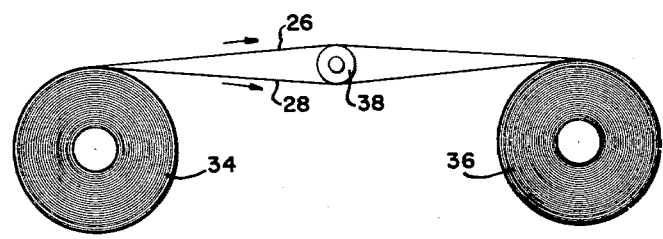
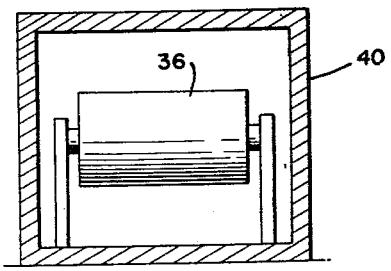
INVENTORS.
GARRETT S. NAGLE
JOE E. ROBERSON
By their attorneys
Glenn and Jackson

United States Patent Office 3,169,300
Patented Feb. 16, 1965

3,169,300
FOIL ROLL SYSTEM
Garrett S. Nagle, Jackson Heights, N.Y., and Joe E. Roberson, Richmond, Va., assignors to Reynolds Metals Company, Richmond, Va., a corporation of Delaware
Original application June 18, 1958, Ser. No. 742,847, now Patent No. 3,049,229, dated Aug. 14, 1962. Divided and this application Nov. 28, 1961, Ser. No. 160,967
2 Claims. (Cl. 29—18)

This invention relates to rolls of metal foil suitable for domestic and other uses, and more particularly to a process for manufacturing rolls of plural layers of metal foil. This application is a division of our copending application Serial No. 742,847 filed June 18, 1958.

Aluminum foil has become widely accepted as a useful and attractive wrapping material for many household and other uses. For industrial purposes, it is feasible to order a wide variety of rolls of foil, with a wide choice of gauges and widths, suited to the particular requirements of each customer. For household use, the practical limitations of the distribution system preclude offering the customer such a wide choice, and efforts are concentrated on supplying a reasonable variety to suit the average demand. For ordinary wrapping purposes, rolls of foil 0.0007 inch gauge are customary, and for heavier wrapping purposes, foil of 0.001 or 0.0015 inch gauge has been offered for retail sale. While both the lighter and heavier gauges have found wide public acceptance, keeping a supply of boxes of rolls of foil of both the light and heavy gauges on hand at all times often presents a problem to the individual user, particularly in the case of those users who seldom require more than a small amount at a time of any one gauge.

In accordance with the present invention, the convenience of users of foil for wrapping and similar purposes, particularly small users, is greatly improved, by winding plural layers of foil, instead of only a single layer, into the rolls offered to retail customers. Each layer is in intimate surface contact with the next layer but not adhered thereto, so that the layers of foil can be used as a single composite sheet, or, alternatively, the plural layers can be detached from each other and used separately. The fact that the consumer has the option of using the single layers of foil enables him to multiply the effective length of the roll which he has purchased without any cost, whenever he feels that a lighter gauge of foil would serve his purpose. On the other hand, the composite sheet of unseparated plural layers is as easy to apply and clings as well as a conventional single layer of foil having the same total thickness, but the composite sheet is better than the single thick layer because any pin holes which may occur in one of the plural layers will almost never coincide with a pin hole in the other layer, whereas any pin hole in conventional foil will always extend straight through the single layer without any adjacent layer to block the opening. Consequently, the multi-layer foil provides a more securely impermeable barrier against the penetration of moisture and gases, and it has the further advantage of being less likely to lose its impermeability as a result of small tears and breaks which may occur during the wrapping operation.

The tendency of the composite plural layers of foil to remain together is enhanced when the rolls of plural layers of foil are packaged in dispensing boxes having serrated cutting edges for severing successive lengths of the foil in the box. The preferred serrated cutting edges form a fine sawtooth pattern across the cut edge, which tends to hold the cut edges together until the consumer chooses to separate them deliberately. The invention further contemplates an improved system of producing rolls of multi-layer foil. In the course of conventional foil rolling operations, two strips of foil are "doubled" and run together in the last pass of the rolling mill operations. A roll of doubled foil is thus produced and it is conventional to respool this foil into two separate rolls, one for each strip, before the annealing operation which precedes the conventional slitting and spooling of the foil into rolls of retail size. In accordance with the present invention, the roll of doubled foil is run through a rewinding operation during which the two strips of foil are separated from each other, but then the two strips are brought back together and wound on a single roll, which is thereafter annealed, slit and spooled in the same way that conventional spools containing a single strip of foil are handled. The separation during the rewinding operation before annealing prevents the multiple strips from sticking together during the subsequent operations, but bringing the strips back together into a single roll provides a roll which can be handled in accordance with conventional procedures during annealing, slitting and spooling, and yet ultimately provides retail rolls containing multiple layers of foil.

For a better understanding of the invention, reference is now made to the present preferred embodiments of the invention which are shown, for purposes of illustration only, in the accompanying drawings. In the drawings:

FIG. 1 is a perspective view of a dispensing box containing a plural roll of foil embodying the invention;

FIG. 2 is an end view of the roll of foil shown in FIG. 1, with the box shown in section, and the foil drawn out and two sections of the foil cut away, one section having its layers of foil together, and the other section having its layers of foil partially separated;

FIG. 3 is an enlarged cross-sectional view, partially broken away, of a composite sheet of two layers of foil of equal thickness;

FIG. 4 corresponds with FIG. 3, but shows the foil in two layers of unequal thickness;

FIG. 5 is a semidiagrammatic end view of two layers of foil being passed between a pair of work rolls and taken up, in accordance with the invention;

FIG. 6 is a semidiagrammatic end view of the rolled foil of FIG. 5 being rewound into a new roll, and separated by a bar before being rewound; and FIG. 7 is a semidiagrammatic sectional view of the rewound roll of FIG. 6 in an annealing furnace.

Referring now more particularly to the drawings, and initially to FIG. 1, there is illustrated a dispensing box 10 containing a roll 12 of a composite strip of foil 14 made up of plural layers of foil in intimate surface contact across the opposed faces thereof so that the layers tend to remain together until they are deliberately separated. The leading end of the composite strip of foil 14 is adapted to be drawn over a serrated cutting edge mounted on box 10, for purposes of cutting sheets 18 of the foil from the roll.

The serrations of the blade 16 impart a serrated edge to the cut ends of the sheets 18, and this cutting action aids in holding the layers of foil in the sheets 18 together as a unitary composite sheet suitable for wrapping purposes, particularly where a relatively thick sheet is desired. A simple manipulation of the composite sheets 18 between thumb and forefinger will initiate separation of the layers in the sheets, which can then be pulled apart to form separate sheets 24 and 22, as shown in FIG. 2. The separated layers of foil 24 and 22 are suitable for wrapping purposes where relatively thin foil is sufficient. While the unseparated composite sheets 18 provide a relatively strong wrapping material, the separated layers 24 and 22 double the area of wrapping material which can be obtained from the roll 12, and consequently are more economical.

The composite strip of foil 14 is preferably made up of two layers 22a and 24b of equal thickness, as shown in FIG. 3, because this form of composite strip is the most readily produced with a minimum departure from conventional foil production practices. It is conventional to combine two strips of foil 26 and 28 and roll them together between a pair of work rolls 30 and 32 at the last stage of the foil rolling operation (FIG. 5). As the strips 26 and 28 leave the rolls 30 and 32 they are taken up together in a roll 34. This roll is conventionally rerolled into two separate rolls, one for each of the strips 26 and 28, before the annealing operation. In accordance with the present invention, however, the roll 34 is rewound onto a single new roll 36, and as the strips 26 and 28 pass between the rolls 34 and 36 they are separated by a separator bar 38, in order to prevent them from becoming stuck together during the annealing operation. The roll 36 of strips 26 and 28 is annealed in a conventional annealing furnace 40, in accordance with conventional annealing practice for the same weight and size of roll, in order to anneal the foil and substantially eliminate the rolling foil slick. After annealing, the roll 36 is slit and spooled into the retail rolls 12, and packaged into boxes 10, by conventional means.

The work rolls 30 and 32 impart a bright finish to the outer surfaces of the strips 26 and 28, so that the outer surfaces of the composite strip 14 and of the composite sheets 18 are bright. The opposed contacting surfaces of the strips 26 and 28 receive a matte finish as they pass through the work rolls 30 and 32, and consequently when the layers 22 and 24 of the composite sheet 18 are pulled apart, they will each be bright on one side, and matte on the other. This difference in the appearance of the composite sheet 18, and the separated sheets 22 and 24, makes it easy to determine which thickness of foil is being used at any time.

The strips 26 and 28 in FIG. 5 are preferably of the same gauge, in accordance with conventional practice, but they can be of unequal gauge, in which case the final composite strip 14, and sheets 18, will have two layers 22b and 24b of unequal thickness, as shown in FIG. 4. Such a composite sheet of two layers of unequal thickness has the advantage of offering the user a choice of three different thicknesses, depending on whether he uses the sheet in its unseparated composite form, or uses the two layers separately. For example, if one of the sheets 24b is twice as thick as the other sheet 22b, the user would have a choice of the thickness of the thinner layer 22b, or of the thicker layer 24b (which is twice that of the thinner layer), or of the combined layers (three times that of the thinner layer 22b). It is also possible to make the composite strip 14 and sheets 18 of more than two layers of foil, if desired, preferably during a pre-annealing rewinding operation like that shown in FIG. 6, except that more than two strips would be taken up on the rewound roll 36.

For the purposes of the invention, the thickness of the individual layers of foil is preferably a minimum of about 0.00035 inch, and preferably a maximum of about 0.001 inch, although both of these limits could be exceeded, if desired. The present preferred practice of the invention is to use two foil layers of equal thickness, preferably 0.0005 inch for each layer. The foil can be of any metal or material, but is preferably dead soft, slick annealed aluminum foil having an aluminum content of at least about 99.35%.

While present preferred embodiments and practices of the invention have been illustrated and described, it will be understood that the invention is not limited thereto, but may be variously embodied and practiced within the scope of the following claims.

We claim:
1. A process for producing rolls of a composite double layer aluminum foil for household and related uses comprising the steps of: passing two strips of aluminum foil while in intimate contact with each other through a rolling mill to form a first roll of doubled aluminum foil, said strips tending to cling together as a result of said rolling mill operation, separating said strips forming said doubled foil in the course of rewinding said first roll into a second roll of double layer aluminum foil, and annealing said double layer aluminum strip while wound in said second roll, said prior step of separating said strips of aluminum foil preventing said strips from sticking during annealing, and respooling said double layer of aluminum foil from said second roll into smaller rolls of easily separable composite double layer aluminum foil.

2. A process of producing a roll of a composite, and easily separable double layer aluminum foil from a first roll of double layer aluminum foil, said layers of foil tending to cling together to form a single doubled foil in said first roll, comprising the steps of: momentarily separating said strips forming said doubled foil in the course of winding said first roll into a second roll of double layer aluminum foil, and annealing said strip while wound in said second roll, said separating of said strips preventing said strips from sticking during annealing, thereby providing a roll of composite and easily separable double layer aluminum foil.

References Cited in the file of this patent

UNITED STATES PATENTS

| | | |
|---|---|---|
| 2,084,705 | Poole et al. | June 22, 1937 |
| 2,179,461 | Yoder | Nov. 7, 1939 |
| 2,642,764 | Porth | June 23, 1953 |

FOREIGN PATENTS

| | | |
|---|---|---|
| 307,422 | Germany | July 8, 1911 |